TIBOR S. LASZLO
INVENTOR.

BY
ATTORNEYS

ZIRCONIA — COLD ROLLED STEEL

ZIRCONIA — COLD ROLLED STEEL

TIBOR S. LASZLO
INVENTOR

BY

ATTORNEYS

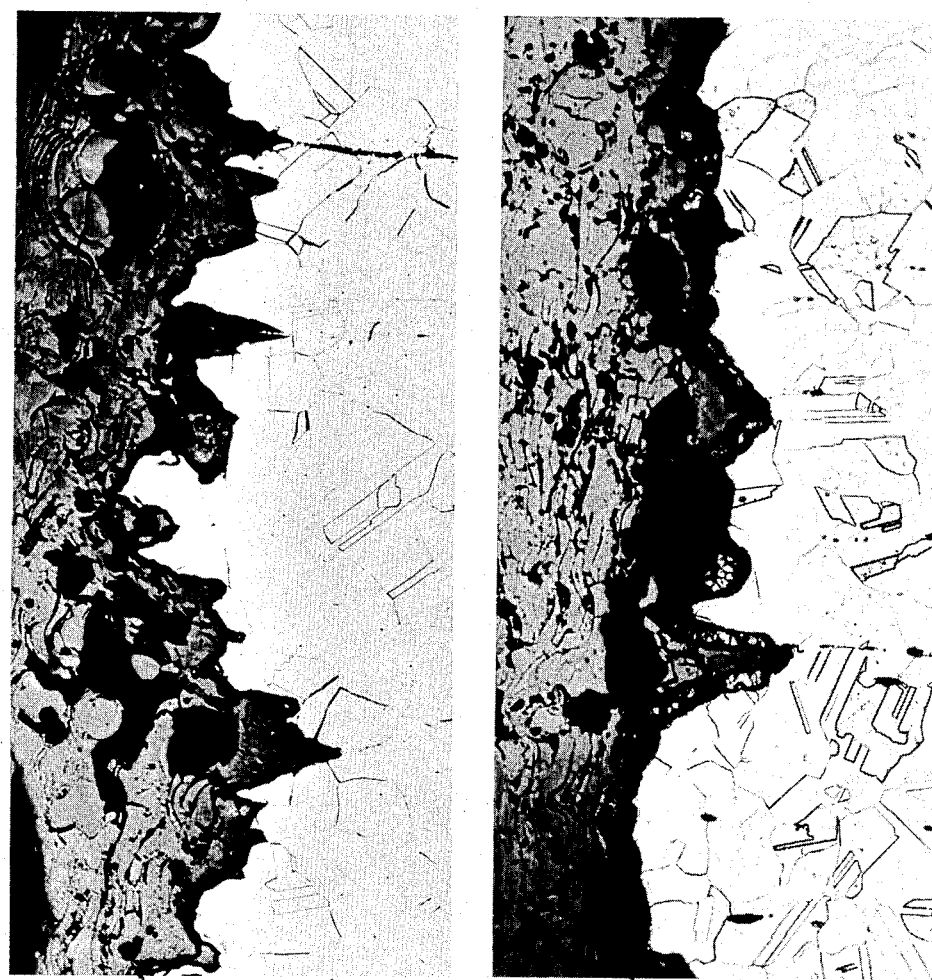

United States Patent Office 3,093,503
Patented June 11, 1963

3,093,503
COATED MATERIALS HAVING AN UNDERCUT SUBSTRATE SURFACE AND METHOD OF PREPARING SAME
Tibor S. Laszlo, Melrose, Mass., assignor to Avco Corporation, Cincinnati, Ohio, a corporation of Delaware
Filed Dec. 29, 1959, Ser. No. 862,550
28 Claims. (Cl. 117—49)

This invention relates to processes for preparing a crystalline substrate which is to be coated, and to coated materials having an interlocked mechanical bond at the interface of the substrate and the coating. More particularly, this invention relates to methods of preparing the surface of a metal substrate by preferential crystal etching.

For purposes of this discussion, a crystal surface is defined as including crystal faces which correspond to crystallographic planes, exterior surfaces which do not follow crystallographic planes and grain boundaries defined by abutting crystals. A crystal surface may also be referred to, in the following discussion, as an original boundary. On the other hand, an exposed interior surface of a crystal will be cited as a cut surface.

One of the most important properties controlling the usefulness of a coating is its ability to remain bonded to the substrate. The coating and substate usually differ greatly in such properties as thermal expansion coefficient, melting point, crystal structure, thermal conductivity, tensile strength, creep, to name a few. If a composite material comprising a coated substrate is exposed to mechanical and/or thermal shocks, the two components, coating and substrate are likely to separate unless they are held together by a strong bond.

There are, in the ultimate analysis, only two types of bonds that are widely found between solid materials, i.e. chemical bonds, and mechanical bonds.

The chemical bond makes use of a chemical reaction at the surface of the substrate to produce at the interface between the substrate and coating an intermediary filler compound, usually an oxide or a carbide. In typical mechanical bonds, the coating is in direct contact with the substrate. Ideally an interlocked interface, resembling a dovetail construction, is desired because it results in an extremely high strength bond.

Mechanical coatings applied to a substrate prepared by known techniques, in most cases, exhibit a very weak mechanical bond at the interface. Various attempts have been made in the past to increase the strength of the interface bond. In general, the prior art techniques may be placed in three classes:

(1) Obtaining a purely adhesive bond by thoroughly cleaning the surface of the substrate with solvents or pickling.

(2) Pitting the substrate surface to increase the surface area.

(Included herein are chemical and abrasive techniques which do not change the nature of the bond—it is still an adhesive bond—only its magnitude.)

(3) Developing a mechanically interlocked bond at the interface by providing a distribution of undercut protuberances on the substrate surface.

The development of undercut protuberances on the surface of the substrate has been widely recognized as providing a tenacious mechanical bond between the substrate and the coating, since it performs like a dovetailed interface.

A satisfactory process for developing an undercut surface is not known today. Prior attempts to produce undercut protuberances include direct gritblasting at 45° angle first in one direction from the perpendicular and then from the opposite direction. It was hoped to develop undercuts and re-entrant angles for a good mechanical bond. There have been indications in the literature, however, that this method has not proved to be successful, and it is certainly not being used today to any great extent. A possible reason why this method failed appears to be that the blasting from the second direction abrades whatever overhang or protuberances were developed during the first blasting.

Experiments have shown that gritblasting at an acute angle in a single direction reduces the size of the crystals projecting from the surface and provides a liberal sprinkling of crystals which exhibit a tenuous hold on the substrate. The projecting crystals often separate from the substrate when a coating is applied and prevent the coating from being deposited on the substrate in these areas.

With the advent of rocket propulsion the need for materials which can withstand extremely high temperatures has become critical. A possible material included in this area are metals which are provided with refractory coatings to withstand extremely high temperatures. Although the practitioners have, for many years, attempted to obtain a good mechanical bond at the interface of the coating and the metal substrate, a recognized satisfactory solution is not shown in the prior art.

It is an object of the invention to provide a method of preparing a surface of a substrate which is to be coated whereby a more tenacious and durable interface bond is obtained.

It is still another object of the invention to present a method of preparing a surface of a substrate which is to be coated, whereby a mechanically interlocked interface between the coating and the substrate is developed.

It is yet another object of the invention to provide an etching process for processing a substrate which is to be coated whereby a mechanically interlocked interface will be obtained.

It is still another object of the invention to provide a method of preparing the surface of a crystalline substrate which is to be coated wherein the substrate crystals are preferentially etched.

It is still another object of the invention to provide a coated material wherein the interface between the coating and the substrate comprises many mechanically interlocked bonds.

It is another object of the invention to provide a coated material wherein the interface between the coating and the substrate has an irregular contour and includes many undercut protuberances defining irregular indentations.

It is yet another object of the invention to provide a crystalline substrate which is to be coated, the substrate having irregular indentations similar in shape and magnitude to the substrate crystals.

In accordance with the invention, the method of preparing a substrate which is to be coated comprises immersing the substrate in a etchant for a predetermined time, the etchant having the ability to discriminate between crystal surfaces of different crystallographic orientation as well as between grain surfaces, grain boundaries and cut surfaces. The discrimination is in respect to the rate of reaction between the etchant and the substrate in such manner that the rate of reaction is different at the various crystal surfaces, various cut surfaces, and between crystal surfaces and cut surfaces.

Another feature of the invention comprises a coated material including a substrate, the surface of which has irregularly contoured protuberances defining undercut indentations. The coated material includes a coating deposited on the substrate surface and conforming with the shapes of the indentations whereby a mechanically interlocked interface is developed.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIGURE 6 is a photomicrograph (500×) of stainless steel coated with zirconia; and FIGURE 7 is a photomicrograph (500×) of copper coated with zirconia.

Theory of the Process

Figure 1:
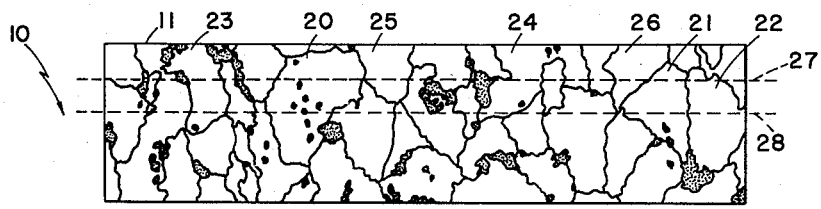
FIGURE 1 is a highly magnified representation of the crystal structure at the surface of a substrate which is to be prepared for receiving a coating.

Briefly, the method discussed herein is directed to treating the surface of the substrate prior to the coating in such a manner that a large number of small irregular indentations, defined by irregular protuberances, are developed. Many of the protuberances have undercuts and define indentations that include a wider internal dimension than that of the mouth. When these undercut indentations are filled with a coating, they provide a mechanical interlocked bond, or anchor. To remove the coating from a substrate prepared with the undercut indentations, one must shear the protruding section of the substrate or the coating. It is not possible to remove the coating merely by overcoming the adhesive forces at the interface.

During the study of crystal growth, it was found that the specific free surface energy varies greatly on different faces of a crystal. The larger the free surface energy the greater the adsorption of a reagent has to be in order to effect a change of a crystal surface. In the etching procedure of a crystal the following steps can be distinguished:

(1) Diffusion of the hydratized electropositive and electronegative ions to the phase boundary;
(2) Adsorption of these ions at the crystal face;
(3) Formation of a compound at the crystal face;
(4) Dissolution of the compound from the crystal face.

Since the free surface energy is different on the different crystal surfaces and cut surfaces of the crystal, the adsorption of ions at the surface will be different, also. As the adsorption is the rate determining step in an etching process, the latter is also specific as to the crystal and/or cut surfaces.

There has been a great deal of experimental evidence which supports the theory that different crystal faces of crystals of a given material do not behave uniformly. It was found that single crystals of iron immersed in distilled water showed pitting of those grains which were oriented with respect to one crystallographic plane while grains oriented with respect to another crystallographic plane were not pitted at all. In corrosion studies of Ni/Cr alloys, it was found that the degree of oxidation depends on the orientation of the crystals. The number of grains of oxide on a given surface varies greatly in accordance with the orientation of the metal crystal.

In addition to the different rate of solution at different crystal and/or cut surfaces, the rate varies also according to the position of the point of attack on the crystal. It has been shown that more energy is required to remove an ion from an ionic crystal face than from a corner of an edge of a crystal. A solution of ionic crystals can be regarded as a process of gradual removal of ions and their transfer into the solvent. The above is also true for any crystal consisting of atoms, ions or molecules, i.e., in general particles.

A further differentiation in reaction rates between various crystal sections is based on electrochemical principles. There is evidence of a potential difference between the crystalline grains in some minerals and a variable solubility rate at different sections of the same crystal. This suggests, to the applicant, a different rate of solubility at different crystal areas of a section due to the fact that the section would cut each crystal in a different manner with respect to its major axis.

Heretofore, the observations outlined briefly above were made in fundamental studies on single crystals. Although these studies show that different faces of a single crystal do not behave uniformly under the influence of external stimuli, this knowledge has not been put to a practical use. An important consideration, however, of this present invention is the recognition that one or more of the aforementioned nonuniform solubility characteristics of single crystal surfaces can be used to prepare a substrate which is to be coated whereby a strong mechanically interlocked bond can be created at the interface of the coating and the substrate.

Application of the Theory

A surface cut on a metal exposes the individual crystals in a random orientation. Furthermore, some crystals expose at the surface original crystal faces, whereas others have been severed by the cut at a random manner in respect to crystallographic planes. Referring to FIGURE 1 of the drawings, a photomicrographic representation of a cold-rolled steel section, magnified 500 times, is shown. The heavy lines define original, intact boundaries of crystals whereas the light lines, at the surface in FIGURE 1, define the surface boundary at which the crystal was severed. The dotted areas represent a carbonous material.

In the following discussion reference will be made to intact crystals and severed crystals. The former defines the crystals in which all of its original boundaries exist. This is illustrated by crystals designated 20–23 in FIGURE 1. A severed crystal is a crystal in which one or more of its original boundaries have been destroyed and one or more internal surfaces exposed, by any convenient means. Representative severed crystals are illustrated at 23–26.

It is recognized in the present invention that when a cut surface is etched under controlled conditions, the rate of reaction at each exposed cut crystal surface can be made different. In addition, the rate of reaction at an original crystal boundary can be made substantially different from the rate of reaction at any cut surface. Accordingly, it is possible to conduct the etching process so that some crystal fragments are completely removed during an interval of time wherein the original crystal boundary remains intact, or only slightly attacked by the etching. Since the shape of the crystal is random, some of the holes created by the removal of the crystals are wider below the surface than at the surface, giving rise to the undercut protuberances which are being sought for developing a strong interlocked mechanical interface.

It must be emphasized that in the present invention the etchant distinguishes between exposed crystal surfaces and reacts at different rates with these surfaces. Accordingly, the etching, for the most part, follows crystal boundaries and produces indentations which resemble in shape and size the crystal structure. The process will be referred to as preferential chemical etching.

The preparation of a substrate surface by means of preferential chemical etching methods was widely investigated, and the results will be outlined below. The selection of an etchant was made by considering the position of the material in the E.M.F. series, the solubility of metal in reagents, the solubility of the reaction product in the reagent, etc. All of the previously mentioned effects have been widely documented based on the vast history of commercial etching processes. It was found that a slower over-all rate of reaction was more likely to give a significant difference in the rate of reaction between the various crystal surfaces, and between these surfaces and an original boundary. Accordingly, a diluted solution of reagents at room temperature was found to give the most satisfactory results. It is to be emphasized, however, that the practice of the present invention is not limited to the use of diluted solution of reagents at room temperature. It was found in certain instances that once the optimum results were obtained, shorter over-all periods of time required for preparing a substrate were possible through the use of more concentrated reagents.

It has been observed that the process is more effective with the larger sizes of individual crystals in the material. It is, therefore, desirable to change the crystal structure by an annealing or similar process where the surface crystals have been reduced in size by previous metallurgical processes.

Referring to FIGURE 1 of the drawings, there is shown a photomicrographic representation of a crystalline substrate specimen 10. The crystal structure is that of cold-rolled steel. It is to be emphasized, however, that this invention is not limited to any particular crystalline configuration or material. The surface of the specimen 10 is the upper horizontal surface 11. It will be assumed that surface 11 has been prepared in a machining process. Although all of the crystals forming the surface 11 are severed, this is a coincidence and not a requirement.

Figure 2:
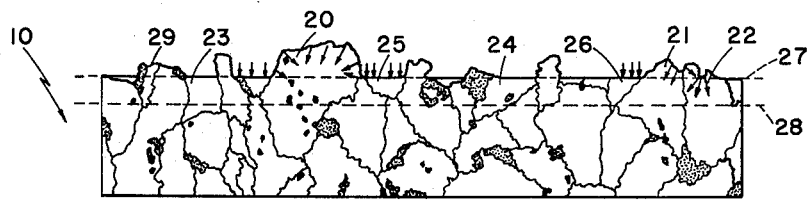
FIGURE 2 is a representation of the FIGURE 1 section after it has been partially prepared.

In FIGURE 2 of the drawings there is depicted the specimen 10 in the course of its preparation and after it has been subjected to a preferential chemical etchant for a period of time. A new, and irregular surface 29 has been formed by the etchant. Line 27 denotes the maximum depth reached by the etchant.

Figure 3:
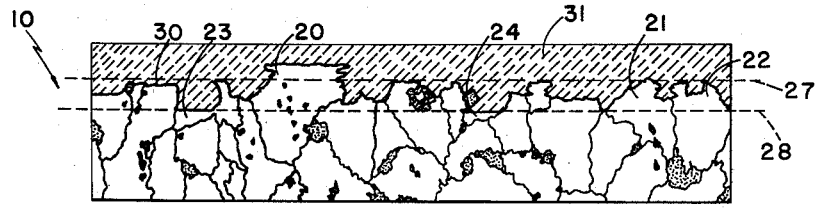
FIGURE 3 is a representation of the FIGURE 1 section with a coating deposited on the surface.

FIGURE 3 shows specimen 10 coated with a ceramic coating 31. Line 28 denotes the maximum depth reached by the etchant. The final etched surface is designated 30, and it will be noted that the contour of the surface 30 is highly irregular. It will also be noted in FIGURE 3 that the ceramic coating 31 has been deposited in the indentations defined in surface 30; and it conforms to the shape of the indentations.

It is not intended to suggest that the precise etching mechanism is known. It is recognized, however, that in most crystal materials the rate of reaction of an etchant on an original crystal boundary is substantially different from its rate of reaction on a cut surface. In most cases it is a simple matter to perceive the aforementioned difference. Accordingly, to simplify an explanation of the structures shown in FIGURES 1–3, the discussion will be limited to the effect of an etchant on an original crystal boundary and its effect on a cut surface of a severed crystal.

In the case of cold-rolled steel, preferential chemical etching was accomplished with a 7%, by weight, nitric acid solution. The nitric acid dissolved a cut surface at a substantially higher rate than an original crystal boundary. Referring to FIGURE 2 of the drawings, it will be seen that surface 11 was entirely dissolved by the etchant. In addition, it will be noted that the severed crystals 23–26 have been etched to the line 27, whereas the intact crystals 20–22 were not noticeably affected by the etchant. In the course of continuing the preferential chemical etchant, severed crystals 23–26 were etched to the line 28. It will be noted in the time interval represented by change of conditions shown in FIGURES 2 and 3 that the etchant overcame the original boundaries of crystals 21—22 and started to dissolve these crystals. Once through an original boundary, the etchant will react at the accelerated rate for cut surfaces.

Referring briefly to crystal 20 in FIGURE 2, it will be noted that the top and part of the vertical surfaces have been exposed to the etchant. Accordingly, when the etchant finally breaks through the original boundary, it will dissolve the top and side surfaces in the directions shown by the arrows in FIGURE 2. As a result, the etchant will tend to burrow into the sides of the crystal 20 at the same time that it is dissolving the top surface. The result of the combined action is an undercut protuberance illustrated in FIGURE 3.

Referring to crystals 21 and 22 in FIGURE 2, it is seen that the original crystal boundaries included indentations. Since the entire boundaries are subjected to the etchant, and since the rate of the reaction of the etchant is much greater in a cut surface, a breakthrough at the indentations of crystals 21 and 22 will tend to blossom out and undercut these crystals as shown in FIGURE 3.

Referring to FIGURE 3 of the drawings, the interface between the ceramic coating 31 and the substrate 10 is roughly delineated between lines 27 and 28. It is quite obvious that the ceramic coating 31 cannot be removed from the coating without shearing the undercuts of the coating or of the substrate to which it is attached. The ceramic coating deposited in the indentations and defined in the substrate 10 conforms closely to the shape of these indentations, and there is developed an interlocked mechanical bond, the nature of which resembles the idealized dovetail construction. Referring briefly to the indentation that was crystal 24, it will be seen that the bottom of the indentation is greater than its opening. This condition can also be observed on the interlocked construction of crystals 21 and 22.

Figure 4:
FIGURE 4 is a photomicrograph (500×) of cold-rolled steel specimen coated with zirconia.

Referring to the actual photomicrograph of a ceramic coating deposited on a cold-rolled steel substrate illustrated in FIGURE 4, it will be noted that the shape and size of the surface indentations conform generally to the shape and size of the substrate crystal. The illustrated surface was obtained by immersing a cold-rolled steel specimen in 7%, by weight, nitric acid for 25 minutes.

Outlined below are examples of the etchant and time required to preferentially chemical etch other metals. All experimental data was obtained with the etchant maintained at room temperature—roughly 71° F. All percentages are by weight.

Copper:
    Composition of the etchant—
        1 part volume 20% sulfuric acid
        3 part volume 10% nitric acid
    Time—70 hours Cast iron:
    Composition of etchant—15% nitric acid
    Time—15 minutes 316 Stainless Steel (AISI Standard):
    Composition of etchant—
        2 part volume 40% nitric acid
        3 part volume 20% hydrochloric acid
    Time—10 minutes Magnesium:
    Composition of etchant—2% ammonium nitrite solution in water
    Time—8 hours
        (Followed by a dipping into a dilute acetic acid solution to remove loose surface particles)

Figure 5:
FIGURE 5 is a photomicrograph (500×) of another specimen of cold-rolled steel coated with zirconia.

Referring to FIGURES 5, 6 and 7 of the drawings, there will be seen photomicrographs of cold-rolled steel, stainless steel and copper, respectively, coated with zirconia. In each case the metal substrate was prepared in accordance with the teachings of the present invention, and more particularly, in accordance with the examples just cited.

That the indentations resemble in shape and size the respective crystal structures is immediately obvious. It is equally obvious to a person skilled in the art that this type of surface—in particular the highly irregular contour containing undercut protuberances—cannot be developed using prior art techniques for preparing a surface of a substrate.

In the previous paragraph the process was outlined in general terms and specific examples cited. The etchant constituents and times outlined in the examples will provide very satisfactory surfaces, and are considered to be the most efficient combinations. Other satisfactory formulations are outlined below. These serve to emphasize that the process described herein can be practiced with a wide variety of etchants, i.e., constituents, and concentration, which will be clear to a skilled practitioner providing he is familiar with "preferential crystal etching."

Copper:
    Composition of etchant—
        1 part volume 10% sulfuric acid
        3 part volume 30% nitric acid
    Time—2.5 hours
Cast iron:
    10–21% nitric acid
    Time—23–9 minutes
Cold-rolled steel:
    6–10% nitric acid
    Time—25–20 minutes
316 Stainless Steel (AISI Standard):
    2 part volume 30% nitric acid
    3 part volume 25% hydrochloric acid
    Time—10 minutes
316 Stainless Steel (AISI Standard):
    1 part volume 70% nitric acid
    3 part volume 30% hydrochloric acid
    Time—15 minutes
Magnesium:
    5% ammonium nitrate solution in water
    Time—22 hours General considerations directed to selecting an etchant for a particular substrate will now be considered. Experimentation in preferential crystal etching has shown that the location of a substrate metal in the E.M.F. series and the concentration of positive ions provide a good guide for selecting an etchant for a particular substrate. It is well known that strong acids contain a high concentration of positive hydrogen ions for a given aqueous solution. The strength of the acid is inversely related to the pH value which in turn is the reciprocal of the logarithm, to the base "10," of the value expressing the hydrogen ion concentration. It is also well known that metals which are located near the top maximum positive potential of the E.M.F. series are very vulnerable to acids. It is, therefore, obvious that a metal that stands high in the E.M.F. series will be dissolved very quickly by a strong acid, magnesium in nitric acid for example. To preferentially etch a metal such as magnesium, therefore, a weak acid, such as acetic acid or a salt solution, such as ammonium nitrite, is preferred. Additionally, it is quite obvious that bases can be used under conditions, with amphoteric metals for example.

With regard to the use of normal salt solutions, the metal ion in the salt should not be remote from the substrate in the E.M.F. series, it being well known that the rate of reaction is directly related to the potential difference of the two metals in the E.M.F. series.

It is also well known that concentrated solutions of acids react more violently than dilute solutions. Since it is desired to develop the maximum gradient between the rate of reactions of the etchant with the crystal surfaces and with the cut surfaces, a dilute acid offers the best approach. As a corollary observation, metals which stand in a low position—toward maximum negative potential—in the E.M.F. series may be treated with strong acids, as indicated in the preceding experimental examples.

Additionally, an etchant is selected so that the reaction product is soluble in the etchant. In this way, the surface of the substrate will be continuously exposed to the etchant.

While it is virtually impossible to list all the permutations and combinations which may be used, the proper combination of substrate and etchant can be easily determined by a person skilled in the art following the teachings of this disclosure.

The disclosed process is compatible with many types of coatings applied in many ways. Refractory ceramics are best applied in a flame spray process, whereas paints and initially liquid coatings may be brushed on. It is obvious that the coating should flow into the surface indentations to create the most effective bond.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. A process for preparing the surface of a polycrystalline substrate having crystals in a random crystallographic orientation comprising: treating the surface of the substrate with an etchant which will react with different surfaces of a substrate crystal at different rates; maintaining said treatment for a predetermined time.

2. A process for preparing the surface of a polycrystalline substrate having crystals in a random crystallographic orientation comprising: subjecting the surface of the substrate to an etchant which will have a rate of reaction with respect to a crystal surface different from its rate of reaction with respect to a cut surface; and maintaining said treatment for a predetermined time to produce indentations which are substantially similar in shape and size to substrate crystals.

3. A method of coating a polycrystalline substrate comprising: forming the substrate dimensionally; treating the surface of the substrate with an etchant which will react with different surfaces of a substrate crystal at different rates; maintaining said treatment for a predetermined time; and depositing a coating on the surface.

4. A method of coating a polycrystalline substrate comprising: forming the substrate dimensionally; subjecting the surface of the substrate to an etchant which will have a rate of reaction with respect to a crystal surface different from its rate of reaction with respect to a cut surface; maintaining said treatment for a predetermined time; and depositing a coating on the surface.

5. A method of coating a polycrystalline substrate comprising: forming the substrate dimensionally; treating the surface of the substrate with an etchant the character of which will dissolve different surfaces of a crystal at different rates; maintaining said treatment for a predetermined time; and depositing a coating in a molten state on the surface of the substrate.

6. A process as defined in claim 5 in which the etchant will chemically react with the crystals of the substrate to form a reaction product that is soluble in the etchant.

7. A process as defined in claim 5 in which the etchant is an acid.

8. A process as defined in claim 5 in which the etchant is a salt solution.

9. A process for preparing the surface of a polycrystalline substrate which is to be coated comprising: treating the surface of the substrate with an etchant which will react with different surfaces of a substrate crystal at different rates; said etchant being a normal salt solution having a metal ion, said substrate and the metal ion being at proximate locations on the E.M.F. scale.

10. A process for preparing the surface of cast iron which is to be coated comprising: treating the surface of the cast iron with substantially 15% nitric acid for selectively etching different surfaces of the substrate crystals at different rates; and maintaining said treatment for substantially fifteen minutes at room temperatures.

11. A process for preparing the surface of copper which is to be coated comprising: treating the surface of the copper with 1 part volume substantially 20% sulfuric acid, 3 part volume substantially 10% nitric acid for selectively etching different surfaces of the substrate crystals at different rates; and maintaining said treatment for seventy hours at room temperatures.

12. A process for preparing the surface of cold-rolled steel which is to be coated comprising: treating the surface of the cold-rolled steel with substantially 7% nitric acid for selectively etching different surfaces of the substrate crystals at different rates; and maintaining said treatment for substantially twenty-five minutes at room temperatures.

13. A process for preparing the surface of 316 stainless steel (AISI standard) which is to be coated comprising: treating the surface of the stainless steel with 2 part volume substantially 40% nitric acid, 3 part volume substantially 20% hydrochloric acid for selectively etching different surfaces of the substrate crystals at different rates; and maintaining said treatment for substantially ten minutes at room temperatures.

14. A process for preparing the surface of magnesium which is to be coated comprising: treating the surface of the magnesium with substantially 2% ammonium nitrite solution in water for selectively etching different surfaces of the substrate crystals at different rates; maintaining said treatment for substantially eight hours at room temperatures; and dipping into a dilute acetic acid solution to remove loose surface particles.

15. A coated material comprising: a polycrystalline substrate having a multiplicity of undercut substantially single crystal protuberances thereon; and a coating deposited on the surface of the substrate in intimate contact therewith.

16. A coated material comprising: a polycrystalline substrate having a multiplicity of indentations therein, said indentations being similar in shape and size to a substrate crystal; and a coating deposited in said indentations.

17. A composite material comprising: a polycrystalline substrate having a multiplicity of indentations therein, said indentations resembling in shape and size a substrate crystal; and a coating deposited in said indentations conforming substantially to the indentations.

18. A coated material comprising: a polycrystalline substrate having a multiplicity of undercut substantially single crystal protuberances thereon defining a multiplicity of indentations; and a coating deposited in the indentations and mechanically interlocked with the protuberances.

19. A coated material comprising: a polycrystalline substrate having a multiplicity of undercut substantially single crystal protuberances thereon defining a multiplicity of indentations; and a coating deposited on the surface of said substrate, said coating having second undercut protuberances conforming to the aforementioned indentations defining second indentations conforming to the aforementioned substrate protuberances.

20. A process for preparing the surface of cast iron which is to be coated comprising: treating the surface of cast iron with dilute nitric acid; and maintaining said treatment for sufficient time to produce indentations which are substantially similar in shape and size to a substrate crystal.

21. A process for preparing the surface of cast iron which is to be coated comprising: treating the surface of cast iron with 10 to 21% nitric acid; and maintaining said treatment from 9 to 23 minutes to produce indentations which are substantially similar in shape and size to a substrate crystal.

22. A process for preparing the surface of copper which is to be coated comprising: treating the copper with a mixture of sulfuric acid and nitric acid; and maintaining said treatment for sufficient time to produce indentations which are substantially similar in shape and size to a substrate crystal.

23. A process for preparing the surface of copper which is to be coated comprising: treating the copper with a mixture of sulfuric acid and nitric acid, 1 part to 3 part by volume respectively; and maintaining said treatment for sufficient time to produce indentations which are substantially similar in shape and size to a substrate crystal.

24. A process for preparing the surface of cold-rolled steel which is to be coated comprising: treating the surface of cold-rolled steel with nitric acid; and maintaining said treatment for sufficient time to produce indentations which are substantially similar in shape and size to a substrate crystal.

25. A process for preparing the surface of cold-rolled steel which is to be coated comprising: treating the surface of cold-rolled steel with 6 to 10% nitric acid; and maintaining said treatment from 10 to 25 minutes to produce indentations which are substantially similar in shape and size to a substrate crystal.

26. A process for preparing the surface of magnesium which is to be coated comprising: treating the surface of magnesium with an aqueous salt solution; and maintaining said treatment for sufficient time to produce indentations which are substantially similar in shape and size to a substrate crystal.

27. A process for preparing the surface of magnesium which is to be coated comprising: treating the surface of magnesium with an aqueous ammonium nitrate salt solution; and maintaining said treatment for sufficient time to produce indentations which are substantially similar in shape and size to a substrate crystal.

28. A process for preparing the surface of stainless steel which is to be coated comprising: treating the surface of the stainless steel with a mixture of nitric acid and hydrochloric acid; and maintaining said treatment for sufficient time to produce indentations which are substantially similar in shape and size to a substrate crystal.

References Cited in the file of this patent

UNITED STATES PATENTS

| | | |
|---|---|---|
| 961,550 | Stanley | June 14, 1910 |
| 1,960,958 | Sargent | May 29, 1934 |
| 1,968,922 | Wood | Aug. 7, 1939 |
| 2,387,335 | Leonard | Oct. 23, 1945 |
| 2,411,532 | Escoffery | Nov. 26, 1946 |
| 2,695,249 | Sweo et al. | Nov. 23, 1954 |
| 2,698,813 | Pun Kien Koh | Jan. 4, 1955 |
| 2,885,273 | Oelgoetz et al. | May 5, 1959 |
| 2,941,875 | Amaya | June 21, 1960 |
| 2,967,985 | Shockley et al. | Jan. 10, 1961 |
| 2,984,549 | Roberts | May 16, 1961 |